United States Patent
Crowley et al.

(10) Patent No.: US 11,003,357 B2
(45) Date of Patent: May 11, 2021

(54) MANAGING SINGLE PATH COMMUNICATION BETWEEN A HOST AND A STORAGE SYSTEM

(71) Applicant: EMC IP Holding Company LLC, Hopkinton, MA (US)

(72) Inventors: Owen Crowley, Carrigaline (IE); Scott Rowlands, Marietta, GA (US); Vinay G. Rao, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 59 days.

(21) Appl. No.: 16/569,686

(22) Filed: Sep. 13, 2019

(65) Prior Publication Data

US 2021/0081105 A1 Mar. 18, 2021

(51) Int. Cl.
*G06F 3/06* (2006.01)
*G06F 9/4401* (2018.01)

(52) U.S. Cl.
CPC ............ *G06F 3/061* (2013.01); *G06F 3/067* (2013.01); *G06F 3/0653* (2013.01); *G06F 3/0659* (2013.01); *G06F 9/4401* (2013.01); *G06F 3/0635* (2013.01)

(58) Field of Classification Search
CPC ...... G06F 3/061; G06F 3/0653; G06F 3/0659; G06F 3/067; G06F 9/4401; G06F 3/0635
See application file for complete search history.

(56) References Cited

U.S. PATENT DOCUMENTS

| | | | | |
|---|---|---|---|---|
| 9,985,873 | B1* | 5/2018 | Don | H04L 45/24 |
| 2002/0194294 | A1* | 12/2002 | Blumenau | G06F 3/0662 |
| | | | | 709/213 |
| 2003/0037127 | A1* | 2/2003 | Shah | G06F 11/0724 |
| | | | | 709/220 |
| 2006/0143332 | A1* | 6/2006 | Yagi | G06F 3/0614 |
| | | | | 710/38 |
| 2009/0037638 | A1* | 2/2009 | Izuta | G06F 3/0613 |
| | | | | 710/316 |
| 2009/0248916 | A1* | 10/2009 | Watanabe | G06F 11/2005 |
| | | | | 710/38 |
| 2019/0258599 | A1* | 8/2019 | Shintani | G06F 3/0635 |

* cited by examiner

*Primary Examiner* — Charles Rones
*Assistant Examiner* — Hewy H Li
(74) *Attorney, Agent, or Firm* — Muirhead and Saturnelli, LLC

(57) ABSTRACT

Communications between a host system and a storage system may be restricted to a single I/O path, at least temporarily, without manually manipulating physical connections to the host system and/or storage system or manually data structures defining I/O connectivity. In response to a communication to maintain only a first permitted I/O path between a host system and a storage system, I/O communications may be prevented on any I/O paths between the host system and the storage system, except for the first permitted I/O system, without modifying the definition of any permitted I/O paths on the storage system. One or more fields may be included in entries of a data structure that defines permitted I/O paths, the fields specifying whether an I/O path should be allowed to, or prevented from, carry communications between a host system and the storage system, at least temporarily.

20 Claims, 8 Drawing Sheets

| LSU | Host Port | Storage System Port | Host Single-Path Info | Other Info | |
|---|---|---|---|---|---|
| Dev0 | WWN12 | WWN45 | No | Host X | 1110a |
| Dev1 | WWN9 | WWN117 | No | Host X | 1110b |
| ... | | | | | |
| Dev7 | WWN12 | WWN13 | Yes, BFS | Host Y | 1110d |
| Dev9 | WWN15 | WWN45 | Yes | Host X | 1110e |
| Dev10 | WWN31 | WWN13 | Yes, mgmt. commands | Host Z | 1110f |
| Dev19 | WWN12 | WWN45 | No, BFS | Host Y | 1110g |
| Dev35 | WWN32 | WWN13 | No, Mgmt commands | Host Z | 1110h |
| ... | | | | | |
| Devn | WWN77 | WWN6 | No | Host X | 1110i |

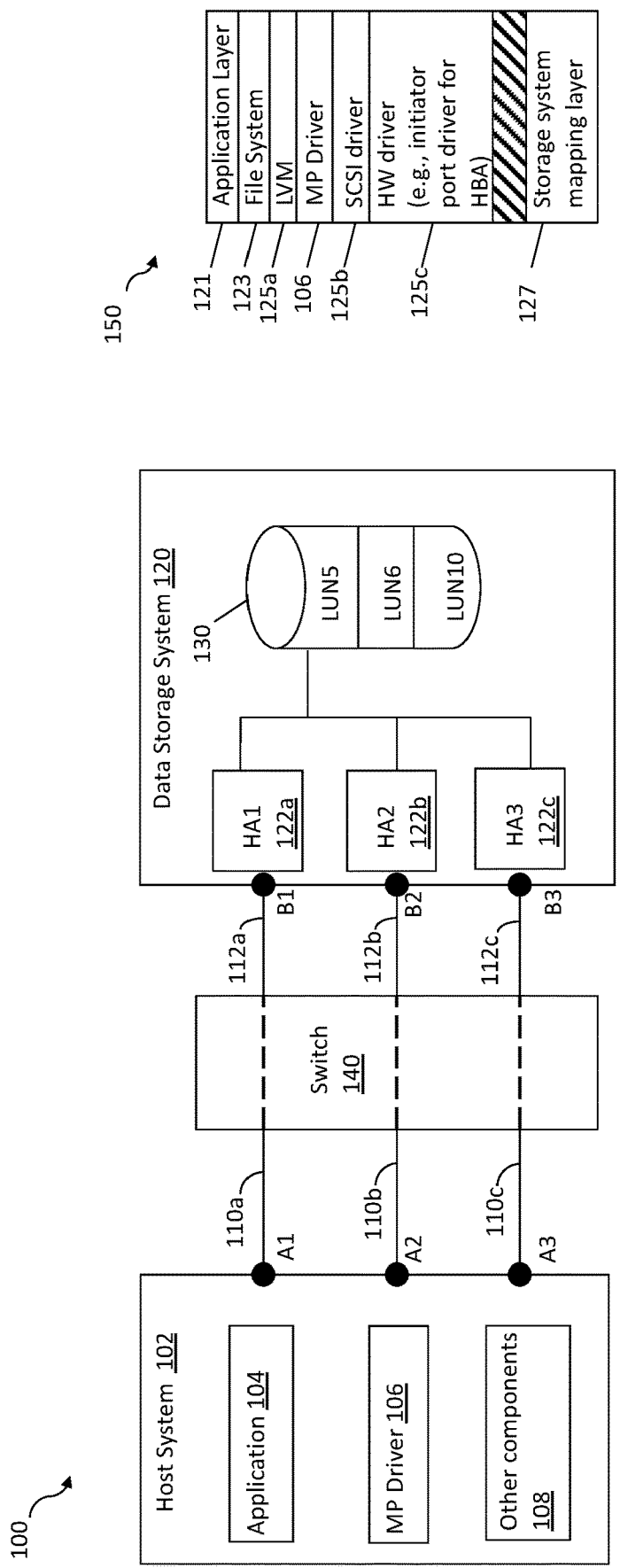

FIG. 11

Table 1100:

| LSU | Host Port | Storage System Port | Host Single-Path Info | Other Info |
|---|---|---|---|---|
| Dev0 | WWN12 | WWN45 | No | Host X |
| Dev1 | WWN9 | WWN117 | No | Host X |
| ... | | | | |
| Dev7 | WWN12 | WWN13 | Yes, BFS | Host Y |
| Dev9 | WWN15 | WWN45 | Yes | Host X |
| Dev10 | WWN31 | WWN13 | Yes, mgmt. commands | Host Z |
| Dev19 | WWN12 | WWN45 | No, BFS | Host Y |
| Dev35 | WWN32 | WWN13 | No, Mgmt commands | Host Z |
| ... | | | | |
| Dev*n* | WWN77 | WWN6 | No | Host X |

FIG. 8

Table 800:

| LSU | Host Port | Storage System Port | Other Info |
|---|---|---|---|
| Dev0 | WWN12 | WWN45 | |
| Dev1 | WWN9 | WWN117 | |
| ... | | | |
| Dev*n* | WWN77 | WWN6 | |

FIG. 9

Table 900:

| Initiator Port | Target Port | Other Info |
|---|---|---|
| WWW1 | WWW3 | |
| WWW7 | WWW8 | |
| ... | | |
| WWW9 | WWW2 | |

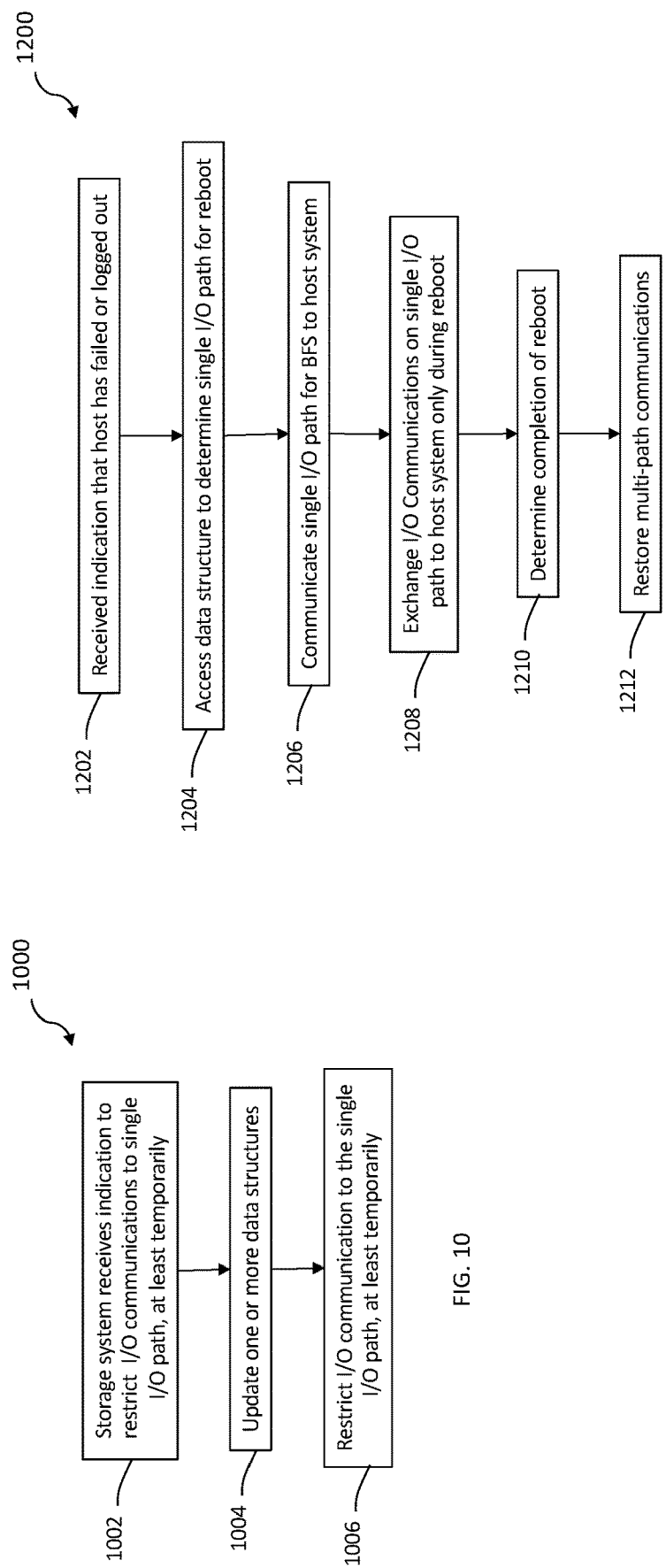

MANAGING SINGLE PATH COMMUNICATION BETWEEN A HOST AND A STORAGE SYSTEM

BACKGROUND

Technical Field

This application generally relates to data storage systems, and more particularly to I/O connectivity on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used.

SUMMARY OF THE INVENTION

In some embodiments of the invention, a method if performed for a data storage network including a plurality of host systems and a data storage system, wherein the data storage system includes one or more data structures that define a plurality of permitted I/O paths between the plurality of host systems and the storage system, including one or more permitted I/O paths between a first of the plurality of host systems and the data storage system, each of the one or more permitted I/O paths specifying a port of the first host system and a port of the data storage system between which I/O communications are permitted. The method includes receiving at the storage system an indication to restrict I/O communications between the storage system and a first of the plurality of host systems to only a first permitted I/O path between the first host system and the storage system, and restricting I/O communications between the first host system and the data storage system to the first permitted I/O path without altering the definition of one or more permitted I/O paths in the one or more data structures.

One or more persons administrating the data storage system may control any modifications to the one or more data structures, and the restricting of I/O communications may be achieved without intervention by the one or more persons.

The received indication may include an indication to restrict I/O communications to the first permitted I/O path during a reboot of the first host system, and the restricting of I/O communications may be performed only during a reboot of the first host system.

The method may further include determining that a reboot of the host system has completed, and, in response to determining that a reboot of the host system has completed, lifting the restriction of the I/O communications to the first permitted I/O path.

Determining that the reboot of the host system has completed may include determining that a read or write operation has been received from the host system on the single path. The indication may be received in a communication from a second of the plurality of host systems, and the indication may be received through a user interface from a person administrating the data storage system.

In some embodiments, a data storage system is on a data storage network including a plurality of host systems and the data storage system. The data storage system includes one or more data structures that define a plurality of permitted I/O paths between the plurality of host systems and the storage system, including one or more permitted I/O paths between a first of the plurality of host systems and the data storage system, each of the one or more permitted I/O paths specifying a port of the first host system and a port of the data storage system between which I/O communications are permitted. The data storage system further includes one or more processors, and memory including code stored thereon that, when executed, performs the above-described method.

In some embodiments, one or more computer-readable media, for example, non-transitory computer-readable media, are provided for a data storage network including a plurality of host systems and the data storage system. The data storage system includes one or more data structures that define a plurality of permitted I/O paths between the plurality of host systems and the storage system, including one or more permitted I/O paths between a first of the plurality of host systems and the data storage system, each of the one or more permitted I/O paths specifying a port of the first host system and a port of the data storage system between which I/O communications are permitted. The one or more computer-readable media has software stored thereon that includes executable instructions to perform the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 5 is a block diagram illustrating an example of a system including a host system communicatively coupled to a data storage system via multiple I/O paths, according to embodiments of the invention;

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining permitted I/O paths between a storage system and one or more host systems, according to embodiments of the invention;

FIG. 9 is a block diagram illustrating an example of a data structure defining permitted I/O paths for a switch, according to embodiments of the invention;

FIG. 10 is a flowchart illustrating an example of a method of restricting I/O communications between a host system and a storage system to a single I/O path, according to embodiments of the invention;

FIG. 11 is a block diagram illustrating an example of a data structure defining single I/O path restrictions between a storage system and one or more host systems, according to embodiments of the invention; and FIG. 12 is a flowchart illustrating an example of a method of restricting I/O communications between a host system and a storage system to a single I/O path during a reboot of a host system, according to embodiments of the invention.

DETAILED DESCRIPTION OF EMBODIMENTS

Figure 1:
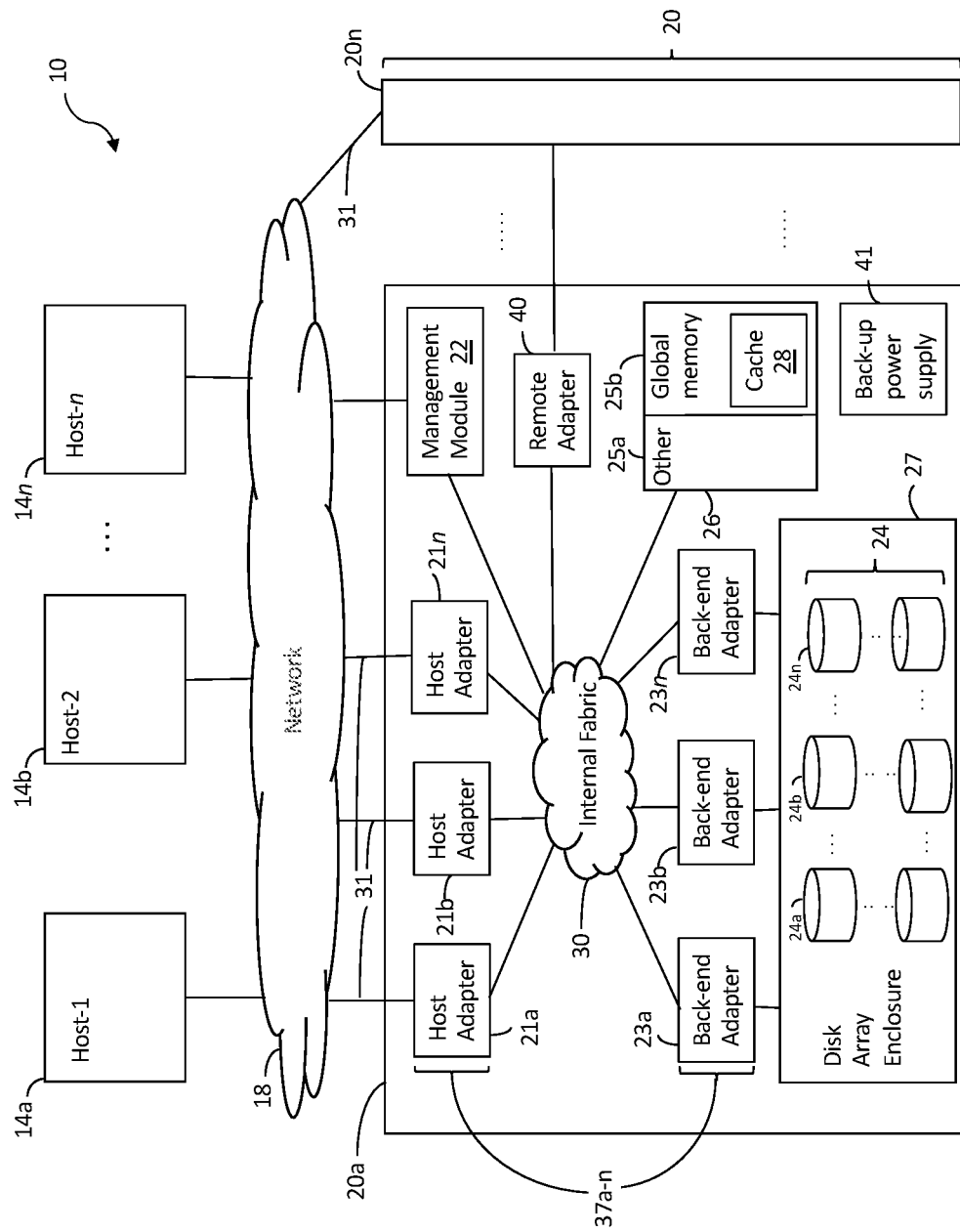
FIG. 1 is a block diagram illustrating an example of a data storage network, according to embodiments of the invention.

The term "I/O path" may be used herein to refer to a communication path between a host system and a storage system including a specific port of the host system (often referred to herein as a "host port") at one end, and a specific port of the storage system (often referred to herein as a "storage port") on the other end, but not necessarily restricted to any specific communication path within a network fabric between the specific host port and the specific storage port. Thus, an I/O path may be defined in terms of a host port and a storage port, for example, in one or more data structures on a data storage network.

In some cases, it may be desirable to restrict communications between a host system and a storage system, for example, for a particular application executing on the host system and/or a particular logical device (e.g., LUN) on (i.e., presented by) the storage system, to one or more specific I/O paths. To this end, a data storage network may include one or more data structures defining one or more I/O paths between a host system and a storage system for which communications are permitted, which may be referred to herein as permitted I/O paths. For example, a switch may include a zoning table as described in more detail elsewhere herein, which defines permitted I/O paths that are not specific to any application or logical device. In some cases, permitted I/O paths are specific to specified applications executing on the host system and/or specified logical devices presented by the storage system. For example, a storage system may include a masking table as described in more detail elsewhere herein, which defines permitted I/O paths that may be specific to a logical device of the storage system.

In an enterprise environment (e.g., a data center) or other data storage network environments, to create and modify masking tables, zoning tables and perhaps other data structures defining I/O connectivity between host systems and storage system, collaboration between host system administrators, network administrators, storage system administrators, one or more business units, service providers and/or other stakeholders may be required, which can result in significant amounts of administrative overhead.

It may be desirable in some circumstances to permit communications between a host system and a storage system only on a single, specific I/O path. This may be desirable, for example, for host systems that are not configured (e.g., are not capable of being configured) to handle multi-path communications with a storage system, or for host systems that require a single path under certain circumstances, for example, when the host system reboots. For example, some host systems are configured to perform what is sometime referred to as a "boot from SAN" (BFS) when they reboot, in which an operating system (OS) of the host system is not stored in non-volatile storage on the host system, but rather is stored remotely. Accordingly, when the host system is rebooted, the basic input/output system (BIOS) or the like of the host system needs to remotely fetch the OS (e.g., from a storage system) and load it onto the host system. BFS may be desirable for large enterprise environments to make it easier to maintain consistent versions of OSs across large numbers of servers and host systems on the enterprise's data storage network. For example, rather than having to upgrade the OS of every host system, one or more copies may be maintained on one or more storage systems and/or select host systems, and downloaded to host systems upon request (e.g., during BFS).

Unfortunately, for some host systems, the BIOS is not configured to handle multiple I/O paths between the host system and the storage system, which may result in the system crashing when performing a BFS; which is why it may be desirable to restrict communications between a host system and a storage system to only a single permitted I/O path between the host system and the storage system during BFS.

It also may be desirable to restrict communications between a host system and a storage system to only a single, specific I/O path for certain types of communications between a host system and a storage system. For example, some storage systems may require that certain management commands be sent only on a specific I/O path between a host system and a storage system.

One could physically restrict communications to a single I/O path between a host system and a storage system by having the network fabric between the host system and the storage system connected by a cable to only one host port and by another cable to only one storage system port, for example, by removing several other cable connections. However, this solution can be labor intensive and prone to human error, and may require updates to zoning tables and/or masking tables that also are prone to human error, and which could cause inadvertent restriction or access to data and other storage system resources.

One also could restrict communications to a single I/O path between a host system and a storage system by modifying zoning tables and/or masking tables. However, in addition to the chance of human error and the time involved in making the changes to zoning tables and/or masking tables, there may be extensive administrative overhead involved in updating zoning tables and/or masking tables, as described above.

What may be desired is a way to restrict communications to a single I/O path between a host system and a storage system, at least temporarily, that does not require manually manipulating physical connections to the host system and/or storage system or manually modifying zoning tables and/or masking tables.

Described herein are techniques and mechanisms for restricting communications to a single I/O path between a host system and a storage system, at least temporarily, that does not require manually manipulating physical connections to the host system and/or storage system or manually modifying zoning tables and/or masking tables. In response to receiving a communication to restrict I/O communications between the host system and the storage system to a first permitted I/O path between the host system and the storage system, I/O communications between the host system and the storage system may be so restricted, for example, may be prevented on any I/O paths between the host system and the storage system, except for the first permitted I/O system, without modifying the definition of any I/O paths on the storage system.

A data structure on a storage system (e.g., a masking table) may define one or more permitted I/O paths for a logical device (or more broadly, a logical storage unit (LSU) as described in more detail elsewhere herein), for example, where the structure includes a plurality of entries, each entry defining an I/O path for an LSU by specifying an LSU, a host port and a storage port. In some embodiments of the invention, one or more fields may be included in one or more entries of such a data structure specifying whether an I/O path should be allowed to carry, or prevented from carrying, communications between a host system and the storage system.

For example, a specific LSU may be associated with BFS for a host system, or certain types of communications from a host system (e.g., management commands). During initial registration of a host system with a storage system, during which I/O path information and other information are exchanged between the host ports and storage ports of the storage system, or at a point in time after such registration, the host system or another host system may communicate to the storage system the single I/O path permitted for BFS and/or for certain commands for the host system. In response to such communications, the storage system may update the one or more fields described above for the appropriate entries of the masking table or other structure(s). This update may be made without modifying the LSU, host port or storage port fields of the entry that defines the permitted I/O path, and without the need to contact or get permission from a storage system administrator.

In some embodiments, a host system is not capable of multi-path communication at all, and this inability is communicated to the storage system; and in response all entries in the masking table or the like for I/O paths between the host system and the storage system, except for one, may be updated to prevent communications thereon.

In some embodiments, rather than receiving such single-I/O-path information from a host system, the information may be entered directly on the storage system (e.g., by a storage administrator), for example, via a user interface provided for the storage system.

In some embodiments, another data structure separate from a masking table or another data structure defining permitted I/O paths may be used to restrict communications between a host system and storage system to a single I/O path, at least temporarily.

The storage system may be configured with single-path logic to access the aforementioned fields of the masking table or other data structure and prevent and/or allow communications accordingly, as described in more detail elsewhere herein. For host systems for which an entry in a masking table or the like specifies that only a specific I/O path should be used for BFS, the single-path logic may be configured to determine when the host system has failed or has logged out, and to restrict communications with the host system to a single I/O path until the single-path logic determines that the host system has completed rebooting. For example, for a planned reboot of the host system (e.g., for maintenance or an upgrade), the single-path logic may receive an indication that the host system has logged out of the storage system. Alternatively, for an unscheduled crash of the host system (e.g., power failure), the single-path logic may detect the crash, e.g., by lack of one or more heartbeat communications from the host system or via a communication from another host system or from the storage system administrator.

In some embodiments, the storage system may determine that a reboot of a host system is complete when it receives a read or write request from the host system on the single I/O path, or by some other means.

A host system may include single-path logic, for example, as part of a multi-path (MP) driver described in more detail elsewhere herein, to implement one or more aspects of the invention. The single drive logic may be configured to communicate to a storage system when the host system itself or another host system desires or needs to be restricted to communicating along a single I/O path between the host system and the storage system, at least temporarily, for example, during BFS, or for certain communications or for any communications (e.g., the host system is not capable of multi-path communication). For example, when a host system is booted for a first time, the BIOS (or the like) of the host system may communicate with an MP driver on the host system. The MP driver (or other logic on the host system) may be configured to determine (from the BIOS or otherwise) whether there are any single-path communication restrictions for the host system, for example, any such restrictions described herein. The MP driver may communicate any such restrictions to the storage system, for example, to single-path logic on the storage system.

Further, in some embodiments, the MP driver may communicate that a single I/O path between the host system and storage system is to be used, for example, for all communications if the host system is not configured for (e.g., is not capable of) multi-path communications, or for certain circumstances (i.e., conditions). For example, if the MP driver learns that the host system requires a single I/O path during BFS, the MP driver may be configured to only present a single I/O path to the BIOS or the like during a reboot.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14*a*-*n* may access the storage system 20*a*, for example, in performing input/output (I/O) operations or data requests, through network 18. For example, each of hosts 14*a*-*n* may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14*a*-*n* and the storage systems 20*a*-*n* included in the storage network 10 may be connected to the network 18 by any one of a variety of connections as may be provided and supported in accordance with the type of network 18. The processors included in the host computer systems 14*a*-*n* may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14*a*-*n* may issue an I/O request to the storage system 20*a* to perform an I/O operation. For example, an application executing on one of the host computers 14*a*-*n* may perform a read or write operation resulting in one or more I/O requests being transmitted to the storage system 20*a*.

Each of the storage systems 20*a*-*n* may be manufactured by different vendors and inter-connected (not shown). Additionally, the storage systems 20*a*-*n* also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14*a*-*n*, for example, to the storage systems 20*a*-20*n*. It should be appreciated that the particulars of the hardware and software included in each of the components that may be included in the storage systems 20*a*-*n* are described herein in more detail, and may vary with each particular embodiment.

Each of the storage systems, such as 20*a*, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24*a*-*n*. In some embodiments, one or more physical storage devices (e.g., one of the rows 24*a*-*n* of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20*a*, a single BE, such as 23*a*, may be responsible for the management of one or more (e.g., a row) of physical storage devices, such as row 24*a*. That is, in some configurations, all I/O communications with one or more physical storage devices 24 may be controlled by a specific BE. BEs 23*a*-*n* may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20*a* also may include one or more host adapters ("HAs") 21*a*-*n*, which also are referred to herein as front-end adapters ("FAs") (e.g., directors configured to serve as FAs). Each of these FAs may be used to manage communications and data operations between one or more host systems and GM 25*b* of memory 26. The FA may be, or include, a Fibre Channel (FC) adapter if FC is a technology being used to communicate between the storage system 20*a* and the one or more host systems 14*a*-*n*, or may be another type of adapter based on the one or more technologies being used for I/O communications.

Also shown in the storage system 20*a* is a remote adapter ("RA") 40. The RA may be, or include, hardware that includes a processor used to facilitate communication between storage systems (e.g., 20*a* and 20*n*), such as between two of the same or different types of storage systems, and/or may be implemented using a director.

Storage system 20*a* also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20*a*, for example, as part of one of host systems 14*a-n* or another separate system connected to storage system 20*a* via network 18.

The FAs, BEs and RA may be collectively referred to herein as directors 37*a-n*. Each director 37*a-n* may include a processing core including compute resources, for example, one or more CPUs cores and/or a CPU complex for processing I/O operations, and may be implemented on a circuit board, as described in more detail elsewhere herein. There may be any number of directors 37*a-n*, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20*a* also may include an internal switching fabric (i.e., internal fabric) 30, which may include one or more switches, that enables internal communications between components of the storage system 20*a*, for example, directors 37*a-n* (FAs 21*a-n*, BEs 23*a-n*, RA 40, management module 22) and memory 26, e.g., to perform I/O operations. One or more internal logical communication paths may exist between the directors and the memory 26, for example, over the internal fabric 30. For example, any of the directors 37*a-n* may use the internal fabric 30 to communicate with other directors to access any of physical storage devices 24; i.e., without having to use memory 26. In addition, one of the directors 37*a-n* may be able to broadcast a message to all of the other directors 37*a-n* over the internal fabric 30 at the same time. Each of the components of system 20*a* may be configured to communicate over internal fabric 30 in accordance with one or more technologies such as, for example, InfiniBand (IB), Ethernet, Gen-Z, another technology, or any suitable combination of the foregoing.

The GM portion 25*b* may be used to facilitate data transfers and other communications between the directors 37*a-n* in a storage system. In one embodiment, the directors 37*a-n* (e.g., serving as FAs or BEs) may perform data operations using a cache 28 that may be included in the GM 25*b*, for example, in communications with other directors, and other components of the system 20*a*. The other portion 25*a* is that portion of memory that may be used in connection with other designations that may vary in accordance with each embodiment. Global memory 25*b* and cache 28 are described in more detail elsewhere herein. It should be appreciated that, although memory 26 is illustrated in FIG. 1 as being a single, discrete component of storage system 20*a*, the invention is not so limited. In some embodiments, memory 26, or the GM 25*b* or other memory 25*a* thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14*a-n*) may be notified that the write operation has completed. At a later time, the write data may be de-staged from cache 28 to one or more physical storage devices 24*a-n*, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20*a* may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
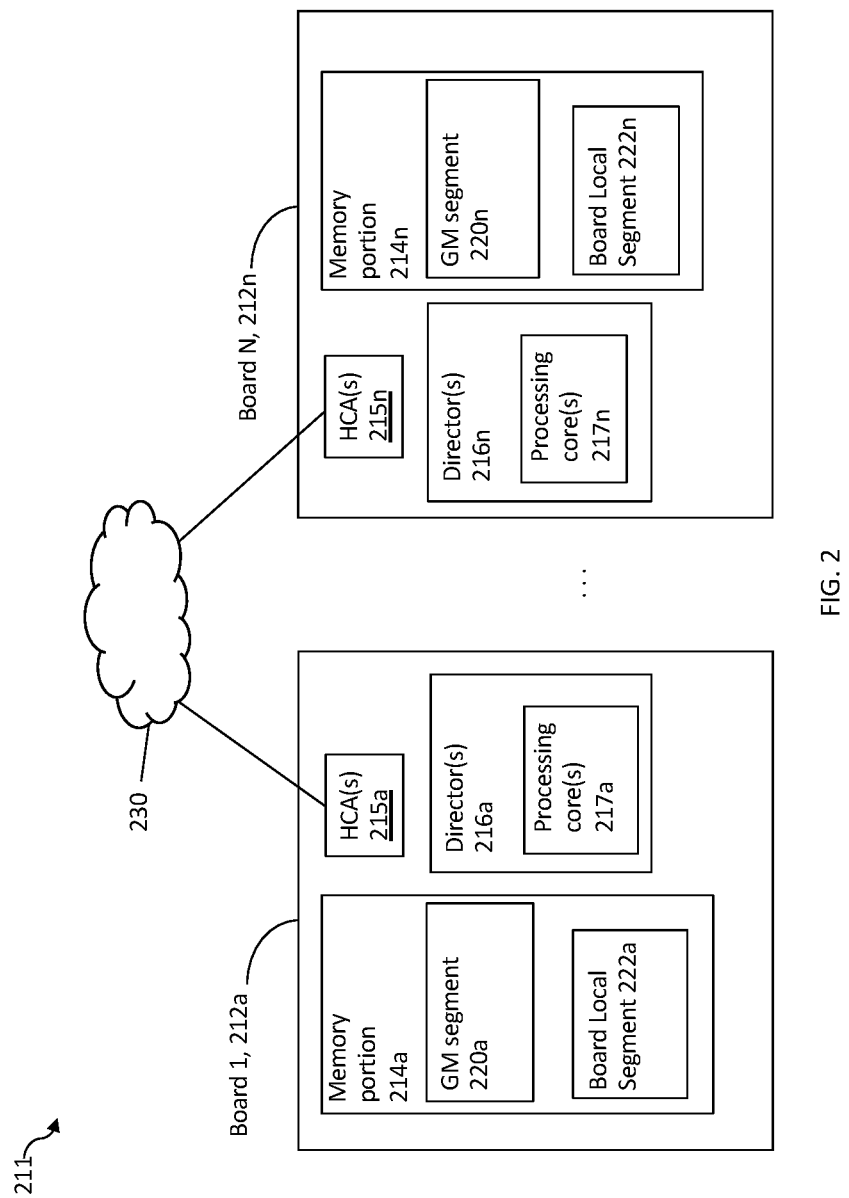
FIG. 2 is a block diagram illustrating an example of a storage system including multiple circuit boards, according to embodiments of the invention.

Any of storage systems 20*a-n*, or one or more components thereof, described in relation to FIGS. 1-2 may be implemented using one or more Symmetrix®, VMAX®, VMAX3® or PowerMax™ systems made available from Dell EMC.

Host systems 14*a-n* may provide data and control (e.g., management and access control) information to storage systems 20*a-n* over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20*a*) including multiple boards 212*a*-212*n*. Storage system 211 may include a plurality of boards 212*a*-212*n* and a fabric 230 (e.g., internal fabric 30) over which the boards 212*a-n* may communicate. Each of the boards 212*a*-212*n* may include components thereon as illustrated. The fabric 230 may include, for example, one or more switches and connections between the switch(es) and boards 212a-212n. In at least one embodiment, the fabric 230 may be an D3 fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
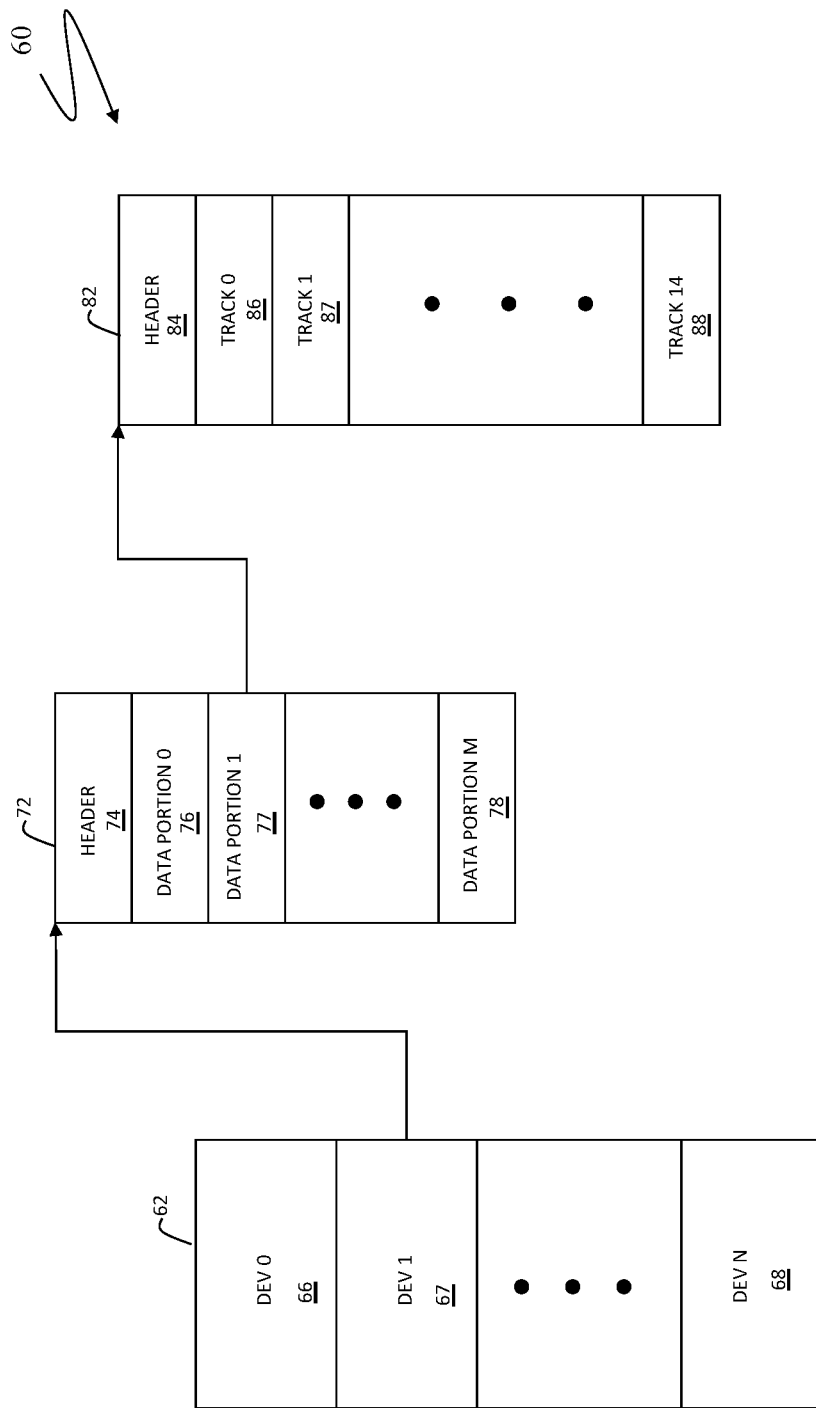
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical devices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 500, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

Figure 3B:
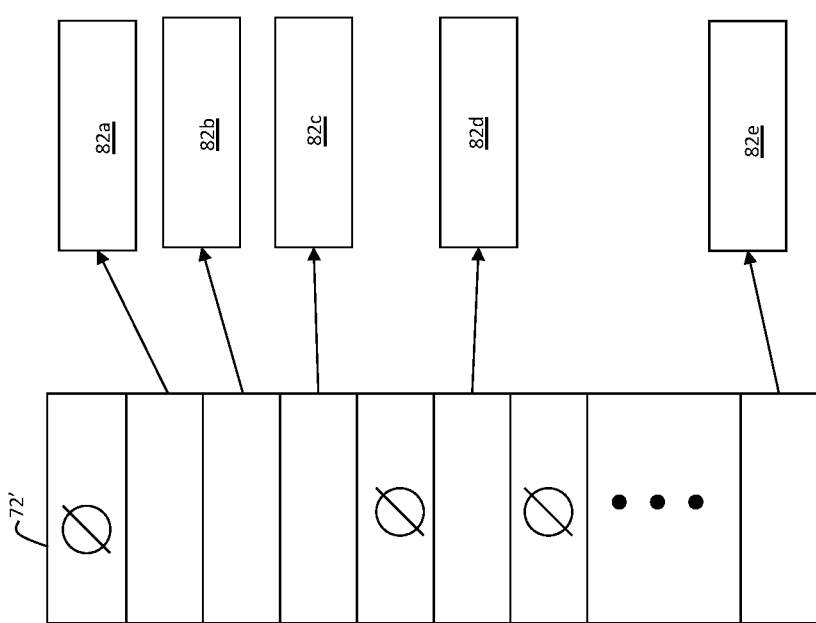
FIG. 3B a block diagram illustrating an example of a table used for a thin logical device, according to embodiments of the invention.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

Figure 4:
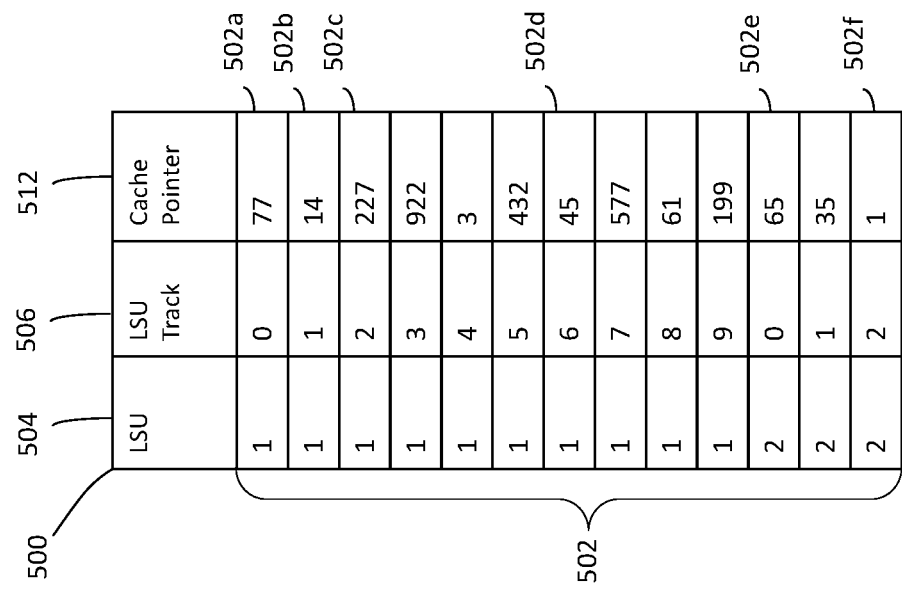
FIG. 4 is a block diagram illustrating an example of a data structure for mapping LSU tracks to cache slots, according to embodiments of the invention.

FIG. 4 is a block diagram illustrating an example of a data structure 500 for mapping LSU tracks (e.g., thin device tracks) to cache slots of a cache. Data structure 500 may be referred to herein as a "cache slot table." Cache slot table 500 may include a plurality of entries (i.e., rows) 502, each row representing an LSU track (e.g., any of LSU tracks 86-88 in track table 82) identified by an LSU ID in column 504 and an LSU track ID (e.g., number) identified in column 506. For each entry of cache slot table 500, column 512 may specify a cache location in a cache corresponding to the logical storage device track specified by columns 504 and 506. A combination of an LSU identifier and LSU track identifier may be used to determine from columns 504 and 506 whether the data of the identified LSU track currently resides in any cache slot identified in column 512. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 500 of FIGS. 3A, 3B, 4 and 5 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 500. Other data structures may be stored in any of GM 25b, memory 25a, GM segment 220a-n and/or board local segments 22a-n.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FEs 122a-122c, also denoted respectively as host adapters HA1, HA2 and HA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple-I/O-path management, including selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125*b* and a hardware (HW) driver 125*c*. The SCSI driver 125*b* may handle processing of a received I/O request from the MP driver 106 such as related to forming a request in accordance with one or more SCSI standards. The driver 125*c* may be a hardware driver that facilitates communication with hardware on the host system. The driver 125*c* may be, for example, a driver for an HBA of the host system which sends commands or requests to the data storage system and also receives responses and other communications from the data storage system. It should be appreciated that, in some embodiments, the ordering of the MP driver 106 and SCSI driver 125*b* may be reversed. That is, in some cases, the MP driver 106 sits below the SCSI driver 125*b*.

In some embodiments, layers 121-125*c* are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125*a*) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125*a*. Communications between an initiator port of the host system and a target port of a data storage system (e.g., target port of an HA) may include those related to I/O operations and other non-I/O commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such I/O path, one or more LSUs may be visible or exposed to the host system initiator through the target port of the data storage system.

Figure 7:
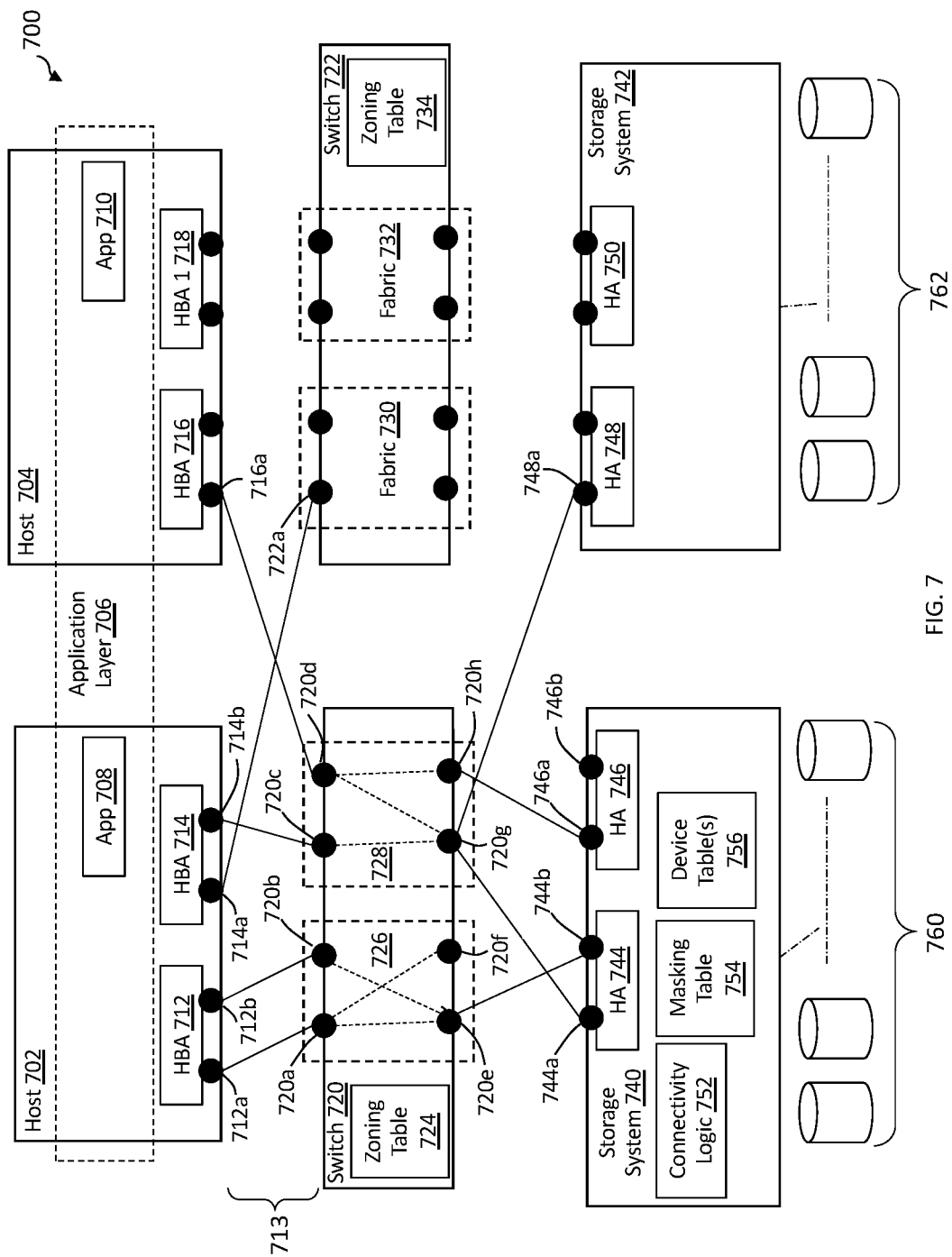
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; physical storage devices 760 and 762; other components; or any suitable combination of the foregoing.

It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective application layers of the software stacks of hosts 702 and 704, each of which may be an application layer 121 as described in relation to FIG. 6.

Host 702 may include any of: a portion of the application layer at 706; application 708; HBAs 712 and 714; and host ports 712*a*, 712*b*, 714*a* and 714*b*. The portion of application layer 706 running on host 702 may include application 708 and one or more other applications. HBA 712 may include host ports 712*a* and 712*b*, and HBA 714 may include host ports 714*a* and 714*b*. HBAs 712 and 714 each may be separate discrete logical or physical components of host 702, and host 702 may include more than the two HBAs illustrated. Each of the host ports 712*a*, 712*b*, 714*a* and 714*b* may be connected to a switch port of switch 720 or 722 (referred to herein as a switch host port (SHP) or fabric port) by physical connections 713. Each such physical connection may be a cable and, in some embodiments, only one physical connection is enabled between each host port and fabric port (e.g., in accordance with a technology standard (e.g., FC)) as illustrated in FIG. 7. That is, in some embodiments, each fabric port is dedicated to one host port. FIG. 7 illustrates host ports 712*a*, 712*b*, 714*a*, 714*b* and 716*a* connected to fabric ports over physical connections 713 in which there is only one physical connection 713 between each host port and each fabric port.

Host 704 may include any of: a portion of the application layer at 706; application 710; HBAs 716 and 718; and multiple host ports including host port 716a of HBA 716.

Switch 720 may include any of: zoning table 724, fabrics 726 and 728; ports 720a-h; other components; or any suitable combination of the foregoing. Zoning table 724 may be a data structure that defines which host ports (as defined by a unique identifier such as a WWN), e.g., corresponding to host ports 712a, 712b, 714a, 714b and 716a, are enabled to communicate with which storage system (e.g., HA) ports, for example, 744a, 744b, 746a, 746b and 748a, which may be referred to herein as storage system ports (SSPs). Zoning tables are described in more details elsewhere herein. The switch 720 may use the information in the zoning table 724 to determine the internal switch connections between fabric ports and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics.

A fabric is a logical entity that includes one or more SHPs and one or more SSPs as its members, for which I/O connectivity associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name. For example, a data structure on switch 720 or elsewhere may define that fabric 726 includes ports 720a, 720b, 720e and 720f.

Switch 722 may include any of: zoning table 734, fabrics 730 and 732; several ports including port 722a; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

Storage system 740 may include any of: connectivity logic 752; masking table 754; device table(s) 756; HAs 744 and 746; storage ports 744a, 744b, 746a and 746b; other components; and any suitable combination of the foregoing. Device table(s) 756 may define properties of LSUs of the storage system 740, including logical devices (which may include thin devices) corresponding to physical storage devices 760, as described in more detail elsewhere herein. Masking table 754 may define which host ports (e.g., 712a, 712b, 714a, 714b, 716a) are permitted to communicate with which LSUs over which storage ports (e.g., 744a, 744b 746a, 746b). Masking tables are described in more detail elsewhere herein.

Connectivity logic 752 may be configured with logic (software, hardware, firmware or a combination thereof) to perform one or processes in accordance with I/O connectivity on a storage network, for example, one or more of the methods described herein, or sub-steps thereof. Storage system 742 may include any of the same or similar components as storage system 740, including HA 748 and storage port 748a thereof. In some embodiments, storage systems 740 and/or 742 may be a storage system 20a and/or 120 described in relation to FIGS. 1 and 5, respectively, or include one or more components and/or functionality thereof.

Storage systems (e.g., the storage systems 740 and/or 742) may maintain data structures (e.g., masking tables) that define I/O connectivity in terms of LSUs, storage ports and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which ports of a storage system ("storage ports," e.g., SCSI targets). Defining (including initially defining and later modifying) which host ports are permitted to perform I/O communications with which LSUs over which storage ports, for example, using a masking table or other data structure, may be referred to as configuring or defining I/O connectivity between a host port, storage port and LSU, or more simply as "masking."

FIG. 8 is a block diagram illustrating an example of a data structure 800 defining permitted I/O paths port between a storage system and one or more host systems, according to embodiments of the invention. Other embodiments of a data structure defining permitted I/O paths between a storage system and one or more host systems, for example, variations of data structure 800, are possible and are intended to fall within the scope of the invention. In some embodiments, data structure 800 may be a masking table (e.g., masking table 754). Data structure 800 may include a plurality of entries 810, each entry representing an LSU (e.g., logical device) identified in column 802 and specifying a host port (e.g., by WWN) in column 804 with which the identified LSU is enabled to communicate I/O over the storage port identified in column 806. Other information, for example, the host and/or the HBA associated with the host port and/or the HA associated with the storage port may be specified in column 808. A data structure other than a table, for example, a linked list and/or object-oriented data structure, may be used to record the same information.

To properly configure I/O connectivity between host ports, storage ports and LSUs, it may be necessary to know the permitted I/O paths between host ports and storage ports (e.g., across a switch fabric), which may be defined by zoning tables on one or more switches of a switch fabric, described in more detail elsewhere herein. Switches may include zoning tables that define the logical connections between SHPs and SSPs of the switch; e.g., by specifying pairs of host port IDs (e.g., WWNs) and storage ports IDs (WWNs), each identified host port corresponding to a directly connected (e.g., by an FC cable) SHP of the switch and each identified storage port corresponding to a directly connected SSP of the switch. Thus, the zoning table defines permitted I/O paths between a host system and a storage system, each I/O path defined by (and including) a host port and a storage port. Such permitted I/O paths may be referred to herein as "zoned I/O paths" or "enabled I/O paths," and the process of defining (including initially defining and later modifying) enabled I/O paths in a zoning table, or the resulting enabled I/O paths collectively, may referred to herein as "zoning."

FIG. 9 is a block diagram illustrating an example of a data structure 900 defining permitted I/O paths across a switch, according to embodiments of the invention. Other embodiments of a data structure defining permitted I/O paths across a switch, for example, variations of data structure 900, are possible and are intended to fall within the scope of the invention. Data structure 900 may be a zoning table, and may include a plurality of entries 910, each entry representing an initiator port (e.g., a host port) in column 902 and a target port (e.g., a storage port) in column 904 with which the initiator port may communicate over a fabric. Other information, for example, host, HBA, HA, fabric name, etc. may be specified in column 906. A data structure other than a table, for example, a linked list and/or object-oriented data structure, may be used to record the same information.

After a switch has been zoned during an initial configuration of a network, and perhaps later if a switch is rezoned, host ports may log into storage ports. A host port logging into a storage port may include the host port and storage port exchanging unique identifiers (e.g., WWNs) and other information, for example, in accordance with an FC protocol. The log-in process also may include the host port inquiring to the storage port about any LSUs available through the storage port, for example, by issuing a REPORT LUNS command in accordance with a SCSI protocol. The storage port may respond with a list of LSUs available to the host port through the storage port, for example, by providing a list of LSU identifiers (e.g., LUNs), after which host registration may be performed. Host registration may include the host port providing host information to the storage port, including, for example: a host operating system (OS), OS level, host vendor and model, vendor unique (VU) commands used by the host, virtual machines (VMs) running on the host, whether the host system is capable of multi-path communication (e.g., at all, during reboot and/or for specific communications) and/or other host information.

During the login of a host port to a storage port, a log-in table on the storage system may be updated. Each entry of the log-in table may represent and specify a host port and a storage port into which the host port logged. For ease of reference, this host port-storage port combination of each entry may be referred to herein as an I-T (initiator-target) pair, even though the invention is not limited to SCSI technology. Each log-in table entry may specify an I-T pair and other information pertaining to the I-T pair.

FIG. 10 is a flowchart illustrating an example of a method 1000 of restricting I/O communications between a host system and a storage system to a single I/O path, according to embodiments of the invention. Other embodiments of a method of restricting I/O communications between a host system and a storage system to a single I/O path, for example, variations of method 1000, are possible and are intended to fall within the scope of the invention. Single-path logic for implementing method 1000 may reside on storage system 740, for example, as part of connectivity logic 752 or elsewhere, for example, as part of a director (e.g., any of directors 37a-n) or management module 22 of storage system 20a.

In step 1002, the storage system (e.g., 740) receives an indication to restrict I/O communications between the storage system and a host system (e.g., 702) to single I/O path, at least temporarily. For example, the indication may be received in a communication from the host system itself (e.g., 702) or another host system (e.g., 704) or may be received via a user interface of the storage system (e.g., 740), for example, from a storage system administrator.

For example, during initial registration of the host system with a storage system, LSU information and I/O path information and other information may be exchanged between the host ports and storage ports of the storage system. During this initial registration, or at a point in time after such registration, the host system or another host system may communicate to the storage system that only the single I/O path is allowed: for reboot (e.g., BFS); for certain communications from the host system; and/or for all communications from the host system, for example, when an OS and/or other components of the host system are not capable of multi-path communication.

In response to receiving the indication in step 1002, one or more data structures (e.g., masking table 754) may be updated in step 1004 to reflect the single-I/O-path restriction, for example, without altering the definition of the one or more permitted I/O paths in the one or more data structures. These updates may be made automatically and/or without permission or intervention by a storage system administrator. For example, a variation of data structure 800, e.g., data structure 1100 described in relation to FIG. 11, may be updated.

FIG. 11 is a block diagram illustrating an example of a data structure 1100 defining single I/O path restrictions between a storage system and one or more host systems, according to embodiments of the invention. Other embodiments of a data structure defining single I/O path restrictions between a storage system and one or more host systems, for example, variations of data structure 1100, are possible and are intended to fall within the scope of the invention. Data structure 1100 may be a modified version of data structure 800 (which defines permitted I/O paths) to which updates may be made without altering the definition of the permitted I/O path; i.e., without removing or changing any of the information defining the I/O path—the host port ID, the storage port ID and the LSU ID.

In addition to columns 802, 804, 806 and 808, described elsewhere herein in relation to data structure 800, data structure 1100 may include a host single-path information column 1107 for specifying single-path information for a host. Further, data structure 1100 may include entries 1110a-1110i. Entries 1110a, 1110b and 1110i may correspond to entries 800a, 800b and 800c with the addition of a field for column 1107 specifying host single-path information for the permitted I/O path defined by the respective entry.

The host single-path information in column 1107 for an entry 1100 may include information pertaining to single-path restrictions for the host system for which the I/O path of an entry is defined. For example, entries 1110a, 1110b, 1110e and 1110i may correspond to ports of host X, as indicated in other information column 808 for these entries. It may have been learned (e.g., by MP driver 106) during registration of host X (e.g., 702) that host X does not have I/O multi-path communication capabilities, and this may have been communicated (e.g., from the single-path logic of the host system) to the storage system (e.g., the single-path logic on the storage system). In some embodiments, the specific single path is determined by the single-path logic on the host system, for example, as specified by the BIOS or other component of the host system or by the host single-path logic selecting from among the permitted I/O paths between the host system and the storage system. Such a selection may be made based on any of a number of factors such as, for example, load balancing. In some embodiments, the specific single path is selected by the single-path logic on the storage system based on any of a number of factors such as, for example, load balancing. In some embodiments, the host system and the storage system may together determine the single I/O path, for example, through an exchange of communications.

In response to receiving the single-path information for the host system X (and perhaps determining the specific I/O path), the single-path logic on the storage system may update the information in column 1107 in entries 1110a,b,e,i. For example, despite the fact there are four permitted I/O paths for host system X in table 1110, the only permitted I/O path for which I/O communications may be allowed between the host system and the storage system is the I/O path defined by 1110e. As such, entry 1110e may have an entry of "Yes" (or another positive binary or Boolean value) and remaining entries for host X, entries 1110a,b,i may have an entry of "No" (or another negative binary or Boolean value).

Further, entries 1110d and 1110g may correspond to ports of host Y, as indicated in other information column 808 for these entries. It may have been learned (e.g., by MP driver 106) during registration of host Y (e.g., 704) that host Y is restricted to single-I/O path communication for management commands, and this may have been communicated (e.g., from the single-path logic of the host system) to the storage system (e.g., the single-path logic on the storage system). In some embodiments, the specific single path is determined by the single-path logic on the host system, for example, as specified by the BIOS or other component of the host system or by the host single-path logic selecting from among the permitted I/O paths between the host system and the storage system. Such a selection may be made based on any of a number of factors such as, for example, load balancing. In some embodiments, the specific single path is selected by the single-path logic on the storage system based on any of a number of factors such as, for example, load balancing. In some embodiments, the host system and the storage system may together determine the single I/O path, for example, through an exchange of communications.

In response to receiving the single-path information for the host system Y (and perhaps determining the specific I/O path), the single-path logic of the storage system may update the information in column 1107 in entries 1110d,g. For example, despite the fact there are two permitted I/O paths for host system Y in table 1110, the only permitted I/O path for which I/O communications may be allowed between the host system and the storage system during a reboot (e.g., BFS) of the host system is the I/O path defined by 1110d. As such, entry 1110d may have an entry of "Yes, BFS" or the like and the remaining entry for host Y, entry 1110g, may have an entry of "No, BFS" or the like. Unlike entries 1110a,b,e,i, which have no additional qualifiers, entries 1110d,g may include the qualifier "BFS" or another qualifier representing same, to indicate that this single-path restriction only applies during BFS.

Further, entries 1110f and 1110h may correspond to ports of host Z, as indicated in other information column 808 for these entries. It may have been learned (e.g., by MP driver 106) during registration of host Z that host Z is restricted to single-I/O path communication for management commands, and this may have been communicated (e.g., from the single-path logic of the host system) to the storage system (e.g., the single-path logic on the storage system). In some embodiments, the specific single path is determined by the single-path logic on the host system, for example, as specified by the BIOS or other component of the host system or by the host single-path logic selecting from among the permitted I/O paths between the host system and the storage system. Such a selection may be made based on any of a number of factors such as, for example, load balancing. In some embodiments, the specific single path is selected by the single-path logic on the storage system based on any of a number of factors such as, for example, load balancing. In some embodiments, the host system and the storage system may together determine the single I/O path, for example, through an exchange of communications.

In response to receiving the single-path information for the host system Z (and perhaps determining the specific I/O path), the single-path logic on the storage system may update the information in column 1107 in entries 1110f,h. For example, despite the fact there are two permitted I/O paths for host system Z in table 1110, the only permitted I/O path for which I/O communications may be allowed between the host system and the storage system for management commands for the host system is the I/O path defined by 1110f. As such, entry 1110f may have an entry of "Yes, Mgmt. commands" or the like and the remaining entry for host Z, entry 1110h, may have an entry of "No, Mgmt. commands" or the like. Unlike entries 110a,b,e,i, which have no additional qualifiers, entries 1110f,h may include the qualifier "Mgmt. commands" or another qualifier representing same, to indicate that this single-path restriction only applies for management commands.

It should be appreciated that there may be more columns in table 1110, for example, in which information illustrated in column 1107 may be distributed. For example, a separate column may be provided to indicate conditions under which the single-I/O-path restriction applies, for example, only during BFS or only for management commands.

It should also be appreciated that one or more additional or alternative data structures (e.g., indexes) to data structure 1110 may be provided in which the values for certain fields/columns of data structure 1110 serve as keys to the data structure (e.g., index). For example, a host index may be provided using the information from column 808 and/or column 804, which may be used to determine any single-path restrictions for a given host.

Returning to method 1000, in step 1006, I/O communications between the host system and the storage system may be restricted to a single I/O path, at least temporarily, for example, for certain conditions. For example, single-path logic on the storage system may be configured to access entries in one or more data structures, for example data structure 1100 and/or other data structures (e.g., indexes), which may be derived from data structure 1100, and to restrict I/O communications to a single path (e.g., under certain conditions) in accordance with the entries. For example, based on entries 1110a,b,e,i, all I/O communications between host system X and the storage system may be restricted to the permitted I/O path defined by entry 1110e. Further, based on entries 1110d,g, all I/O communications between host system Y and the storage system during BFS may be restricted to the permitted I/O path defined by entry 1110d; and, based on entries 1110f,h, all I/O communications between host system Z and the storage system for management commands may be restricted to the permitted I/O path defined by entry 1110f.

The single-path logic or another component on the storage system may determine when a certain condition is met to which a single-I/O-path restriction applies, and control that the restrictions are only applied while the condition is met. For example, it may be determined when a host system has failed and/or logged out, and when rebooting is complete, so that a single-I/O-path restriction for reboot is not applied when reboot is not occurring.

FIG. 12 is a flowchart illustrating an example of a method of restricting I/O communications between a host system and a storage system to a single I/O path during a reboot of a host system, according to embodiments of the invention. Other embodiments of a method of restricting I/O communications between a host system and a storage system to a single I/O path during a reboot of a host system, for example, variations of method 1000, are possible and are intended to fall within the scope of the invention. The logic for implementing method 1200 may reside on storage system 740, for example, as part of connectivity logic 752 or elsewhere, for example, as part of a director (e.g., any of directors 37a-n or management module 22 of storage system 20a. The logic for implementing method 1200 may be part of the single-path logic implementing method 1000.

In step 1202, an indication that a host system Y (e.g., 704) has logged out or failed may be determined. For example, for a planned reboot of the host system Y (e.g., for maintenance or an upgrade), the single-path logic may receive an indication that the host system Y has logged out of the storage system. Alternatively, for an unscheduled crash of the host system Y (e.g., power failure), the single-path logic may detect the crash, e.g., by lack of one or more heartbeat communications from the host system Y or via a communication from another host system (e.g., 702) or from the storage system administrator.

In step 1204, one or more data structures may be accessed to determine a single I/O path for a reboot of the host system (e.g., BFS). For example, entries 1110d,g of data structure 1100 may be accessed as described in more detail elsewhere herein.

In step 1206, a single path for reboot, e.g., determined from entry 1110d of data structure 1100, may be communicated to the host system Y, and, in step 1208, I/O communications between the host system Y and the storage system may be exchanged only on the single path only during reboot of the host system Y.

In step 1210, it may be determined that the reboot has completed. For example, the storage system may determine that a reboot of a host system is complete when it receives a read or write request from the host system on the single I/O path, or by some other means.

In step 1212, multi-path communications may be restored. For example, the single-path logic on the storage system may start using any permitted I/O paths as defined in data structure 1100, as the reboot (e.g., BFS) condition is no longer true. The single-path logic on the storage system may communicate the restored availability of permitted I/O paths to single-path logic on the host system, for example, within MD driver 106, and the host system may start transmitting I/O on the permitted paths again.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1000 and 1200, or parts thereof, may be implemented using one or more of the systems and/or data structures described in relation to FIGS. 1-9 and 11, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage network including a plurality of host systems and a data storage system, wherein the data storage system includes one or more data structures that define a plurality of permitted I/O paths between the plurality of host systems and the storage system, including one or more permitted I/O paths between a first of the plurality of host systems and the data storage system, each of the one or more permitted I/O paths specifying a port of the first host system and a port of the data storage system between which I/O communications are permitted, a method comprising:
    receiving at the storage system an indication of a restriction to restrict I/O communications between the storage system and a first of the plurality of host systems to only a first permitted I/O path between the first host system and the storage system; and in response to receiving the indication, updating at least a first of the one or more data structures to specify the restriction without altering the definition of one or more permitted I/O paths in the one or more data structures; and
    restricting I/O communications between the first host system and the data storage system to the first permitted I/O path, based on the restriction, including accessing at least the first data structure to determine the restriction.

2. The method of claim 1, wherein one or more persons administrating the data storage system control any modifications to the one or more data structures, and
    wherein the restricting of I/O communications is achieved without intervention by the one or more persons.

3. The method of claim 1, wherein the received indication includes an indication to restrict I/O communications to the first permitted I/O path during a reboot of the first host system, and
    wherein the restricting of I/O communications is performed only during a reboot of the first host system.

4. The method of claim 3, further comprising:
    determining that a reboot of the host system has completed; and in response to determining that a reboot of the host system has completed, lifting the restriction of the I/O communications to the first permitted I/O path.

5. The method of claim 4, wherein determining that the reboot of the host system has completed includes determining that a read or write operation has been received from the host system on the single path.

6. The method of claim 1, wherein the indication is received in a communication from a second of the plurality of host systems.

7. The method of claim 1, wherein the indication is received through a user interface from a person administrating the data storage system.

8. A data storage system on a data storage network including a plurality of host systems and the data storage system, the data storage system comprising:
one or more data structures that define a plurality of permitted I/O paths between the plurality of host systems and the storage system, including one or more permitted I/O paths between a first of the plurality of host systems and the data storage system, each of the one or more permitted I/O paths specifying a port of the first host system and a port of the data storage system between which I/O communications are permitted;
one or more processors; and
memory comprising code stored thereon that, when executed, performs a method including:
receiving at the storage system an indication of a restriction to restrict I/O communications between the storage system and a first of the plurality of host systems to only a first permitted I/O path between the first host system and the storage system, in response to receiving the indication, updating at least a first of the one or more data structures to specify the restriction without altering the definition of one or more permitted I/O paths in the one or more data structures; and
restricting I/O communications between the first host system and the data storage system to the first permitted I/O path, based on the restriction, including accessing at least the first data structure to determine the restriction.

9. The data storage system of claim 8, wherein one or more persons administrating the data storage system control any modifications to the one or more data structures, and
wherein the restricting of I/O communications is achieved without intervention by the one or more persons.

10. The data storage system of claim 8, wherein the received indication includes an indication to restrict I/O communications to the first permitted I/O path during a reboot of the first host system, and
wherein the restricting of I/O communications is performed only during a reboot of the first host system.

11. The data storage system of claim 10, wherein the method further comprises:
determining that a reboot of the host system has completed; and
in response to determining that a reboot of the host system has completed, lifting the restriction of the I/O communications to the first permitted I/O path.

12. The data storage system of claim 11, wherein determining that the reboot of the host system has completed includes determining that a read or write operation has been received from the host system on the single path.

13. The data storage system of claim 8, wherein the indication is received in a communication from a second of the plurality of host systems.

14. The data storage system of claim 8, wherein the indication is received through a user interface from a person administrating the data storage system.

15. For a data storage network including a plurality of host systems and a data storage system, wherein the data storage system includes one or more data structures that define a plurality of permitted I/O paths between the plurality of host systems and the storage system, including one or more permitted I/O paths between a first of the plurality of host systems and the data storage system, each of the one or more permitted I/O paths specifying a port of the first host system and a port of the data storage system between which I/O communications are permitted, one or more non-transitory computer-readable media having software stored thereon comprising:
executable code that receives at the storage system an indication of a restriction to restrict I/O communications between the storage system and a first of the plurality of host systems to only a first permitted I/O path between the first host system and the storage system; executable code that updates, in response to receiving the indication, at least a first of the one or more data structures to specify the restriction without altering the definition of one or more permitted I/O paths in the one or more data structures;
executable code to restrict I/O communications between the first host system and the data storage system to the first permitted I/O path, based on the restriction, including accessing at least the first data structure to determine the restriction.

16. The one or more non-transitory computer-readable media of claim 15, wherein one or more persons administrating the data storage system control any modifications to the one or more data structures, and
wherein the restricting of I/O communications is achieved without intervention by the one or more persons.

17. The one or more non-transitory computer-readable media of claim 15, wherein the received indication includes an indication to restrict I/O communications to the first permitted I/O path during a reboot of the first host system, and
wherein the restricting of I/O communications is performed only during a reboot of the first host system.

18. The one or more non-transitory computer-readable media of claim 17, the software further comprising:
executable code that determines that a reboot of the host system has completed; and
executable code that, in response to determining that a reboot of the host system has completed, lifts the restriction of the I/O communications to the first permitted I/O path.

19. The one or more non-transitory computer-readable media of claim 18, wherein determining that the reboot of the host system has completed includes determining that a read or write operation has been received from the host system on the single path.

20. The one or more non-transitory computer-readable media of claim 15, wherein the indication is received in a communication from a second of the plurality of host systems.

* * * * *